US006704887B2

(12) United States Patent
Kwiat et al.

(10) Patent No.: US 6,704,887 B2
(45) Date of Patent: Mar. 9, 2004

(54) METHOD AND APPARATUS FOR IMPROVED SECURITY IN DISTRIBUTED-ENVIRONMENT VOTING

(75) Inventors: Kevin A. Kwiat, Whitesboro, NY (US); Benjamin C. Hardekopf, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 544 days.

(21) Appl. No.: 09/804,751

(22) Filed: Mar. 8, 2001

(65) Prior Publication Data

US 2002/0129296 A1 Sep. 12, 2002

(51) Int. Cl.[7] .................................................. G06F 11/00
(52) U.S. Cl. .............................. 714/10; 714/11; 714/12
(58) Field of Search ............................... 714/10, 11, 12, 714/4, 797; 700/2

(56) References Cited

U.S. PATENT DOCUMENTS

| | | | | |
|---|---|---|---|---|
| 4,569,015 A | * | 2/1986 | Dolev et al. ................. 709/201 |
| 4,583,224 A | * | 4/1986 | Ishii et al. ..................... 714/10 |
| 5,452,441 A | * | 9/1995 | Esposito et al. .............. 714/13 |
| 5,533,188 A | * | 7/1996 | Palumbo ........................ 714/4 |
| 5,572,620 A | * | 11/1996 | Reilly et al. .................. 714/11 |
| 6,061,809 A | * | 5/2000 | Glaser et al. ................. 714/11 |
| 6,141,769 A | * | 10/2000 | Petivan et al. ................ 714/10 |
| 6,141,770 A | * | 10/2000 | Fuchs et al. .................. 714/11 |
| 6,192,483 B1 | * | 2/2001 | Moiin et al. .................... 714/4 |
| 6,470,385 B1 | * | 10/2002 | Nakashima et al. ......... 709/224 |
| 6,526,432 B1 | * | 2/2003 | Briskey et al. ............. 709/201 |
| 6,550,018 B1 | * | 4/2003 | Abonamah et al. ............ 714/6 |

OTHER PUBLICATIONS

Hardekopf et al. Performance analysis of an enhanced–security distributed voting algorithm. Mar. 2001. IEEE. pp. 342–351.*
Hardekopf et al. Secure and Fault–Tolerance Voting in Distributed Systems. Mar. 2001. IEEE. pp. 1–10.*
Hardekopf et al. A Decentralized Voting Algorithm for Increasing Dependability in Distributed Systems. Jul. 2001. IEEE. pp. 1–6.*
Kwiat, Kevin. Distributed Voting Among Voters of Equal Complexity. Aug. 1999. pp. 42–46.*

* cited by examiner

Primary Examiner—Robert Beausoliel
Assistant Examiner—Yolanda L. Wilson
(74) Attorney, Agent, or Firm—Joseph A. Mancini

(57) ABSTRACT

A method and apparatus is disclosed which provides improved security in distributed-environment voting. At least three voting processors running a voting algorithm are connected to a local area network (LAN) and exchange their individually determined results of a process application. Each result is committed to an interface module where it is checked, authenticated and buffered. The allotted time for receiving and buffering committed results is constrained by a first timed interval within the interface module. The first timed interval may be reset several times. The allotted time for checking and comparing the committed results from each processor is constrained by a second timed interval within each voting processor. A majority vote of those authenticated committed results is formed once all necessary iterations of the both the first and second timed intervals are completed. Enhanced security is thereby afforded to the overall voting process and yields a majority vote that is correct despite the introduction of errors associated with faulty or hostile processors.

21 Claims, 8 Drawing Sheets

Phase 1:

```
/* Each P_i in a node does the following,  (1 ≤ i ≤ n) */
vote = function("parameters") /* computation depends on the application */
broadcast("node", vote, P_name) /* broadcast "vote" to all processors (P_name) in "node" */
```

Phase 2:

```
/* Each P_i does the following, (1 ≤ i ≤ n) */
vote[j] = recv_msg(P_j, vote, P_name) 1 ≤ j ≤ n, j ≠ i   /* record vote from all processors */
If ∀i,j : 1 ≤ i,j ≤ n : vote[i] = vote[j]
 begin
   result = vote[i]; /* result contains vote to be committed */
   vote_commit("all"); /* vote commit with param "all" */
 end;
else if (vote[i] = vote[j]) for at least k votes s.t. k ≥ ⌈n/2⌉
 begin
   result = vote of majority; /* result contains value of the majority *
   if ((P_i = P_c) .AND. (vote[i] ≠ result)) /* if current coordinator not in majority */
     select_coord (P_k ∈ majority); /* select new coordinator */
   vote_commit ("majority"); /* commit the majority value */
   if (P_i = P_c)
     local_recovery (for all P_j not in majority); /* start recovery of faulty processors */
 end;
else  /* no majority */
 begin
   P_i(status) = local_diagnostic (P_i), 1 ≤ i ≤ n /* start local diagnostics */
   if (P_i(status) = "okay")
   begin
     select_coord ("node"); /* select new coordinator from "okay" processors */
     if (P_i = P_c) /* new coordinator does the following */
       vote_commit(new_majority); /* commit new majority */
   end;
   else if (P_i(status) ≠ "okay") ∀i , 1 ≤ i ≤ n /* all processors have failed */
     print("complete node failure, external recovery required");
 end.
```

Figure 2
Prior Art

METHOD AND APPARATUS FOR IMPROVED SECURITY IN DISTRIBUTED-ENVIRONMENT VOTING

STATEMENT OF GOVERNMENT INTEREST

The invention described herein may be manufactured and used by or for the Government for governmental purposes without the payment of any royalty thereon.

BACKGROUND OF THE INVENTION

This invention relates to distributed computer systems, fault-tolerance, and security.

Replication and majority voting are the conventional methods for achieving fault-tolerance in distributed systems. The system consists of a set of redundant processors all working on the same task in parallel, then voting on the individual processors' results to pick one as the correct answer. This technique was first proposed, in the context of electronic computing, by John von Neumann about 1945 and has been in use for some time.

Early examples of this technique used centralized voting. Each processor sent its vote to a central counter, which analyzed the votes and determined a majority. There are several problems with centralized voting. First, the central counter represents a single point of failure for the system; if it fails, so does the entire system. Second, the system cannot be readily reconfigured—once it is set up for centralized voting, it is difficult to employ for other tasks.

For these reasons, another technique developed, distributed voting. In a distributed voting system, there is no central counter. The processors communicate among themselves to determine the majority vote. Thus there is no longer a single point of failure for the system. If one processor drops out, the others operate without it. Another attractive feature of distributed systems is dual-mode operation. When a task is critical, as in a space vehicle's launch phase, the processors operate in fault-tolerant mode. When fault tolerance is not required, as in the space vehicle's cruise phase, the processors cease to be redundant and execute in parallel different subtasks. Such a system has been used in the Space Shuttle's primary computer system since the 1970s (cf. A. Spector, D. Gifford, *The Space Shuttle Primary Computer System*, 27 Communications of the ACM, No. 9 (September 1984)).

Prior-art protocols for distributed voting fall into two main types: two-phase commit and Byzantine. Several other protocols have recently been proposed for secure distributed voting. Each of the prior-art protocols has shortcomings that the present invention overcomes.

Two-Phase Commit Protocols

Software voting has had several embodiments in the development of fault-tolerant computing (see J. Wensley, *SIFT: The Design and Analysis of a Fault-Tolerant Computer for Aircraft Control*, 66 Proceedings of the IEEE (October 1978), 1240–1255; G. Farber, *Taskspecific Implementation of Fault Tolerance In Process Automation Systems*, M. Dal Cin and E. Dilger, ed., Self-Diagnosis and Fault Tolerance, Werkhefte Nr. 4 Attempto (Tubingen, 1981); and E. Ammann, et al., *ATTEMPTO: A Fault-Tolerant Multiprocessor Working Station: Design and Concepts*, IEEE Computer Society, Digest of Papers FTCS-13, p10–13, (1983)). More recently, distributed voting has been used for fault diagnosis in linear processor arrays (cf. V. Roda, T. Lin, *The Distributed Voting Strategy for Fault Diagnosis and Reconfiguration of Linear Processor Arrays*, 34 Microelectronics Reliability (No. 6, June 1994), 955–967) where, in the absence of a centralized voter, the array elements share error flags that stem from comparing outputs between connected elements.

Current schemes of distributed voting subscribe to a common protocol. Once voting is complete and a majority result determined, one processor is chosen to commit the majority result to user 4. Thus all are examples of a two-phase commit protocol (see J. Gray and A., Reuter, *Transaction Processing: Concepts and Techniques* (Morgan Kaufmann, 1993)). Voting is the first phase, in which all participants share results. A second phase, in which the committal is executed, follows. A distinguished process coordinates the committal. This type of protocol is prominent in the prior art.

Byzantine Protocols

A second class of protocols for distributed voting are the so-called 'Byzantine' protocols. The SIFT (Software Implemented Fault Tolerance) Program (circa 1975) (described in J. Goldberg, *A History of Research in Fault-Tolerant Computing at SRI International*, A. Avizienis, H. Kopetz, J. C. Laprie, ed., The Evolution of Fault-Tolerant Computing (Springer, Wien, Austria, 1987)) was the first attempt to support fine-grained flexibility in fault-tolerant operation that entailed decentralized voting. This program was also the seedbed for solutions to important problems in fault-tolerant distributed systems (see L. Lamport et al., *The Byzantine Generals Problem*, 4 ACM Transactions on Programming Languages and Systems (No. 3, July 1982)). Byzantine protocols were developed to tolerate voters that can fail in a totally arbitrary manner, such as sending conflicting results to two or more different sets of participating voters. The goal of these protocols is to achieve Byzantine agreement—all participants should have a globally consistent view of the system. Byzantine faults are the most malicious kind of processor faults that can occur, and they are therefore are the most difficult to tolerate.

While Byzantine protocols are more secure than two-phase commit protocols, they are also more complex. The theoretical requirements necessary to guarantee correct system behavior in this situation can be summarized as follows: to tolerate f Byzantine faults, it is necessary to have 3f+1 independent participating voters in the Byzantine fault-tolerant scheme, where the voters are connected by 2f+1 disjoint communication paths, and exchange information f+1 times to arrive at exact consensus (see id.). To tolerate a single fault, the system must consist of four processors, each having three independent communication paths, and require two exchanges of information. To tolerant as few as three faults requires a system with 10 processors, each having seven independent communication paths, and four exchanges of information.

Because of the complexity inherent in a Byzantine fault-tolerant system, which implies huge costs, few such systems have been implemented commercially. This type of protocol is therefore impractical for a commercially viable (i.e., economically feasible) distributed voting system.

Secure Voting Algorithms

Several protocols have been proposed to overcome the problems described above. For example, M. Castro and B. Liskov (*Practical Byzantine Fault Tolerance*, Proceedings of the 3rd Symposium on Operating System Design and Implementation (February 1999) offered an algorithm whose action can be simplified as follows:

A client sends a request to one of the voters.

The voter multi-casts the request to the other voters.

The voters execute the request and send a reply to the client.

The client waits for f+1 replies with the same result, where f is the number of faults to be tolerated; this result is the final one.

This algorithm is not subject to the same problem as the two-phase commit protocol, since every voter can commit a result. However, it does require substantial computation by the client, which must compare all the replies until f+1 have arrived with the same result. Thus this algorithm does not scale well.

Another protocol is described by M. Reiter (*How to Securely Replicate Services,* 16 ACM Transactions on Programming Languages and Systems, No. 3 (May 1994)). Reiter makes use of a (k,n)-threshold signature. Informally; such a protocol generates a public key, along with n shares of a corresponding private key, each of which can produce a partial result on a signed message m. Any k of these partial results can then be used to reconstruct the whole of m. In this particular protocol, n is the number of voters, and k is one more than the number of tolerated faults. Each voter signs its result with its particular share of the private key and broadcasts it to the other voters. The voters then sort through the broadcast messages for k partial results that agree with its own result and combine them into the whole message m, where m would be the signed final result. The voter then sends m to the client, which accepts the first valid m sent.

This protocol is not subject to the error inherent in the two-phase commit protocol (since the digital signature assures the client that f+1 voters agreed with the result; otherwise the result could not have been signed). This protocol is also not computationally expensive for the client. It shifts to the voters the computational burden required to sort through the votes looking for matches. However, the large number of messages that must be sent among the voters, plus the effort of digitally signing and validating these messages, adversely impact the performance of the protocol.

There exist other protocols, each with advantages and disadvantages (see M. Reiter, *The Rampart Toolkit for Building High-Integrity Services,* Theory and Practice in Distributed Systems, Lecture Notes in Computer Science 938, 99–110; D. Malkhi, M. Reiter, *Byzantine Quorum Systems,* Proceedings of the 29th ACM Symposium on Theory of Computing (May 1997); K. Kihlstrom et al., *The Secure Ring Protocols for Securing Group Communication,* 3 Proceedings of the 31st Hawaii International Conference on System Sciences (January 1998), 317–326; Y. Deswarte et al., *Intrusion Tolerance in Distributed Computing Systems,* Proceedings of the 1991 IEEE Symposium on Research in Security and Privacy (May 1991), 110–121.). All make the common assumption that underlies replicating a state-machine—two different voters, starting in the same state and following the same instructions, will inevitably arrive at the same result. This assumption may not hold; for example, it does not hold for the case of so-called inexact voting.

In inexact voting, two results do not have to be bit-wise identical to be considered equal, as long as they fall within a pre-defined range of tolerance. When data comes from sensors that interact with the real world, it is quite unlikely that two different sensors will collect exactly the same data, even if they are arbitrarily close to one another and sample the same phenomena. Therefore some analysis is necessary to determine if the data is effectively equal, even if not identical.

In such situations the above protocols will all encounter problems, because they require that the replicated voters' data be identical. For example, the (k,n)-threshold algorithm above cannot be used for inexact voting—the partial results must be identical to be combined into a whole result for the client.

Though some of these algorithms could be modified to handle inexact voting, multiple inexact comparisons would give rise to prohibitive performance costs. For example, the algorithm in which all voters send their results to the client would force the client to make multiple inexact comparisons to determine the majority. Since inexact comparisons can be complex, this requirement places an unacceptable burden on the client.

While the main difficulty with the above types of protocols is their lack of security, another important consideration is performance. Any alternative protocol that improves security must have performance equivalent to two-phase commit.

Distributed voting for fault-tolerance has the drawback that to obtain a result through comparisons lowers the throughput of the fault-tolerant task. Time is also lost by the added communications required. Increasing fault tolerance by offloading the voting onto all of the processors, thus avoiding the use of a centralized counter, comes with a cost. Distributing the majority voting adversely impacts throughput in even a small multiprocessor (R. E. Harper, J. H. Lala, and J. J. Deyst, *Fault Tolerant Parallel Processor Architecture Overview,* Proceedings of the 18th Fault-Tolerant Computing Symposium (June, 1988), 252–257). In the case of the SIFT (Software Implemented Fault Tolerance) Program (circa 1975), the implementation of the voting in software consumed as much as 60% of the processor's raw throughput (see D. L. Palumbo, R. W. Butler, *A Performance Evaluation of the Software-Implemented Fault-Tolerance Computer,* 9 AIAA Journal of Guidance, Control, and Dynamics, (No. 2, March–April 1986), 175–180). Execution of these software-intensive functions in the MAFT multiprocessor was estimated as two orders of magnitude too slow for a usable system (see C. J. Walter, R. M. Kieckhafer, A. M. Finn, *MAFT: A Multicomputer Architecture for Fault-Tolerance in Real-Time Control Systems,* Proceedings of the IEEE Real Time Systems Symposium (December 1985)). Therefore, a fault-tolerant protocol for software-based majority voting must be chosen to yield the best performance possible.

An earlier paper (K. Kwiat, *Distributed Voting Among Voters of Equal Complexity,* Proceedings of the ISSAT International Conference on Reliability and Quality in Design (August 1999)) proposed a possible solution to the shortcomings of the two-phase commit protocol; namely, that the committal phase should be monitored to ensure that the committed result agrees with the majority vote. The apparatus and method to monitor this final phase is the subject of the present invention.

OBJECTS AND SUMMARY OF THE INVENTION

An object of the present invention is to provide inexact voting in a potentially hostile distributed environment while maintaining security, fault-tolerance, and performance.

A further object of the present invention is to provide a system of fault-tolerant distributed voters working on a redundant task that yields a correct result even if some minority of the voters are faulty or actively hostile.

Still a further object of the present invention is to provide a system of fault-tolerant distributed voters, working on a redundant task that yields a correct result even if some minority of the voters are faulty or actively hostile, that allows for inexact voting.

Yet another object of the present invention is to provide a fault-tolerant distributed system that overcomes the drawbacks of the prior art.

Briefly stated, the present invention provides a method and apparatus which provides improved security in distributed-environment voting. At least three voting processors running a majority voting algorithm are connected to a local area network (LAN) and exchange their individually determined results of a process application. Each result from each of the at least three voting processors is committed to an interface module where it is checked, authenticated and buffered. The occurrence of multiple committed results are checked for. Likewise, committed results are authenticated so as to insure that any result committed is in fact from a friendly processor and not a hostile one. The allotted time for receiving and buffering committed results is constrained by a first timed interval within the interface module. The first timed interval may be reset several times. The allotted time for checking and comparing the committed results from each of the at least three processors is constrained by a second timed interval within each voting processor. Furthermore, the timed interval greatly enhances security because it allows for number of retries by the majority voting algorithm to correct a contrary vote of a hostile or faulty processor. A majority vote of those authenticated committed results is formed once all necessary iterations of both the first and second timed intervals are completed. A voting process with enhanced security results and yields a majority vote that is correct despite the introduction of errors associated with faulty or hostile processors.

According to an embodiment of the invention, a method for improving the security in distributed environment voting, comprises the steps of: initiating a majority voting algorithm within each of at least three voting processors; distributing a committed vote from one of the at least three voting processors, which has not previously committed a vote, to a local area network; passing the committed vote from said local area network to an interface module; buffering, within the interface module, the committed vote from a user; triggering the start of a first timed interval during which subsequent committed votes are received and authenticated; terminating the majority voting algorithm and passing a final result to a user upon lapse of the first timed interval; triggering the start of a second timed interval, upon receipt of a committed vote, within each of at least three voting processors during which each of the at least three voting processors is permitted to compare the committed vote with its own vote; detecting, within each of at least three voting processors, an agreement or a dissent with the committed vote; pausing only those of the at least three voting processors which agree with said committed vote; and either reinitiating the majority voting algorithm upon detection of a new majority dissent with the committed vote or allowing the first timed interval to lapse if no new majority dissent is detected, thereby terminating aid majority voting algorithm.

According to a feature of the invention, apparatus for improving the security in distributed environment voting, comprises: means for initiating a majority voting algorithm within each of at least three voting processors; means for distributing a committed vote from one of the at least three voting processors, which has not previously committed a vote, to a local area network; means for passing a committed vote from a local area network to an interface module; means for buffering, within the interface module, a committed vote from a user; means for triggering the start of a first timed interval during which subsequent committed votes are received and authenticated; means for terminating the majority voting algorithm and passing a final result to the user upon lapse of the first timed interval; means for triggering the start of a second timed interval within each of the at least three voting processors, upon receipt of a committed vote; where the means for triggering further comprising: means for comparing by each of the at least three voting processors of a committed vote to its own vote; means for detecting, within each of the at least three voting processors, an agreement or a dissent with the committed vote; means for pausing only those of the at least three voting processors which agree with the committed vote and either means for reinitiating the majority voting algorithm upon detection of a new majority dissent with the committed vote or means for allowing the first timed interval to lapse if no new majority dissent is detected, thereby terminating the majority voting algorithm.

According to another feature of the invention, apparatus for improving the security in distributed environment voting, comprises: a first device that initiates a majority voting algorithm within each of at least three voting processors; a second device that distributes a committed vote from one of the at least three voting processors, which has not previously committed a vote, to a local area network; a third device that passes the committed vote from the local area network to an interface module; a fourth device that buffers, within the interface module, the committed vote from a user; a fifth device that triggers the start of a first timed interval during which subsequent committed votes are received and authenticated; a sixth device that terminates the majority voting algorithm and passes a final result to the user upon lapse of the first timed interval; a seventh device that triggers the start of a second timed interval within each of the at least three voting processors, upon receipt of the committed vote; a seventh device further comprising: an eighth device that compares the committed vote to the vote of each of the at least three voting processors; a ninth device that detects, within each of the at least three voting processors, an agreement or a dissent with the committed vote; a tenth device that pauses only those of the at least three voting processors which agree with the committed vote; and either an eleventh device that reinitiates the majority voting algorithm upon detection of a new majority dissent with the committed vote or a twelfth device that allows the first timed interval to lapse if no new majority dissent is detected, thereby terminating the majority voting algorithm.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a listing of the pseudocode representative of the prior art.

DETAILED DESCRIPTION OF THE PREFERRED EMBODIMENT

Figure 1:
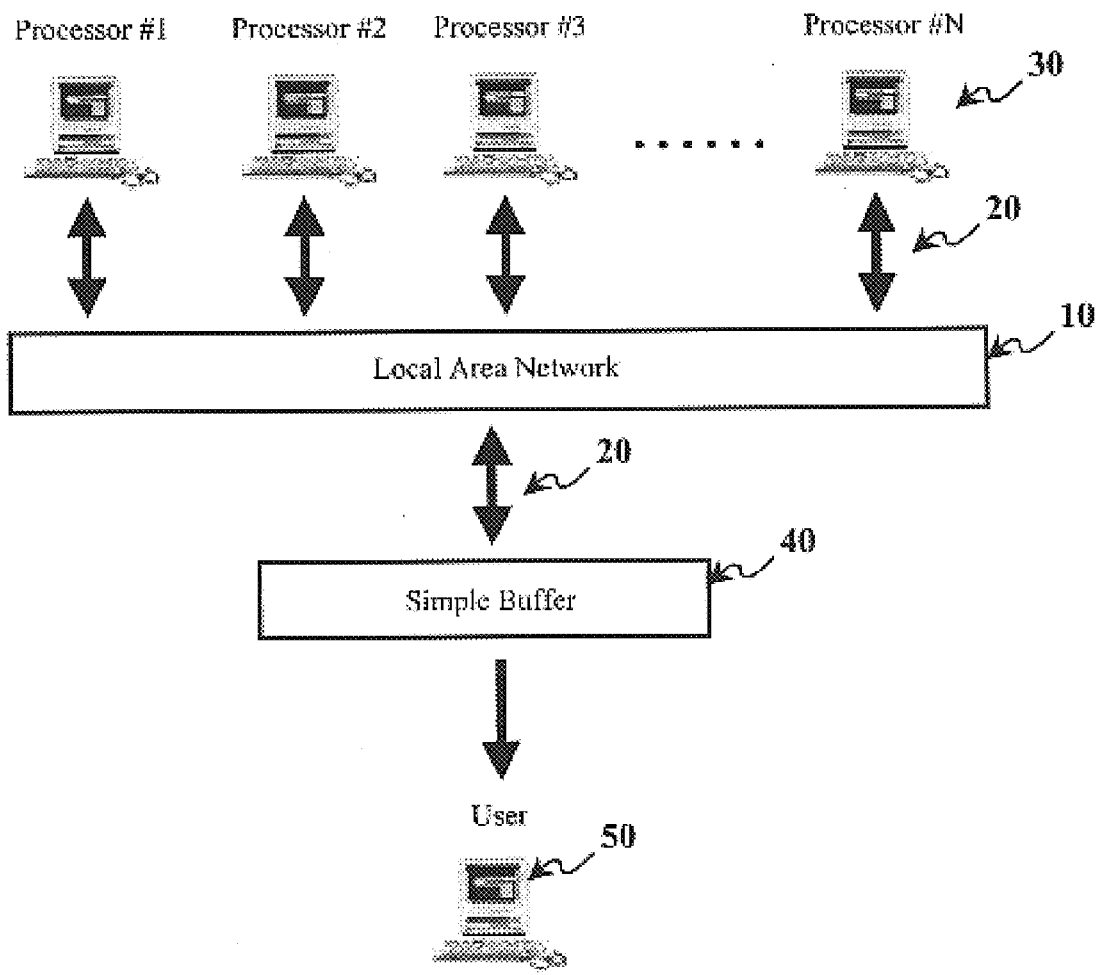
FIG. 1 is a block diagram of the network architecture for the prior art.

Referring to FIG. 1, the distributed environment of the prior art is a local-area network 10 with a bus 20 architecture. General-purpose workstations function as processors #1 through #N 30 are attached to local-area network 10. Also attached is a buffer 40 that is local to a user 50. Buffer 40 holds a final result for user 50 to access.

Because buffer 40 is local to user 50, it is outside the fault containment boundary. Both its location and the fact that it is far less complex than a processor 30 make simple buffer 40 unlikely to fail. The prior art further assumes the following. First, each processor 30 follow the given protocol faithfully (i.e., they may not fail arbitrarily, only by halting or by giving incorrect results). Second, any faulty processor 30 will not disable communications among any of the other processors 30 (e.g., by appropriating the broadcast medium). Third, a processor 30 detects internal faults through a self-diagnostic routine initiated upon demand. The requirement that a processor 30 be unable to disable communications can be met by a network designed to provide fair access to all attached hosts, e.g., a token-ring or token-bus network (see Andrew S. Tanenbaum, *Computer Networks* (Prentice-Hall, 1989)).

FIG. 2 shows the pseudocode of the prior art. Once a task has been given to each processor 30 (see FIG. 1), it individually calculates a result and broadcasts it to all the other processors 30. Once all the votes are broadcast, each processor 30 analyzes them. Whichever result is in the majority is taken to be the final result, and one of the processors 30 in the majority is selected arbitrarily to commit that result to simple buffer 40 (see FIG. 1). Any processor 30 whose vote was not in the majority is faulty and must initiate a recovery routine. If no majority vote exists, then all the processors 30 must run self-diagnostics. Once it has been determined who is faulty and who is not, an arbitrary non-faulty processor 30 is chosen as the coordinator-processor to send its result to simple buffer 40.

The likelihood that the coordinator-processor will fail during committal is negligible, unless the probability that a processor 30 will fail is much higher than is usually expected. Therefore, when one considers only fault tolerance, two-phase commit is a quite legitimate and thus widely adopted protocol for distributed voting. However, when security is also paramount, entrusting committal to the coordinator-processor can have disastrous results. Even if the normal rate of failure of a processor 30 is low, a malicious attacker can provoke errors in exactly the wrong place and time, i.e., at the coordinator during committal. An attacker who takes control of the coordinator-processor can cause it to commit an incorrect result regardless of the answer the processors 30 came up with together. Security measures can be put in place to protect each processor 30, but the fact remains that this protocol provides a single critical point that must be protected, or the security of the whole system is compromised.

Figure 3:
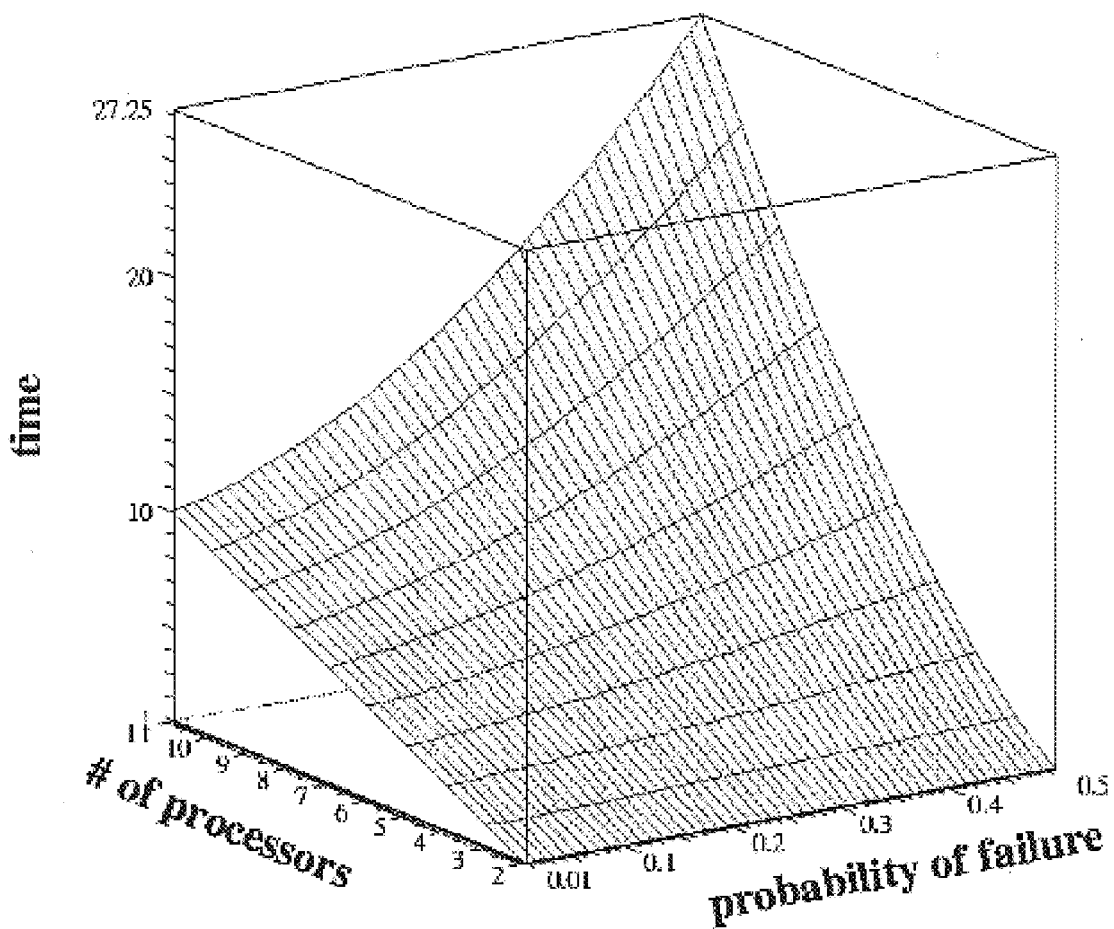
FIG. 3 is a graph of the performance of the prior art.

Referring now to FIG. 3, the time taken by a prior art protocol under various conditions is graphically depicted. For the prior art, the time to determine a final answer depends both on the number of processors 30 (see FIG. 1) and on the status of those processors 30, i.e., faulty or fault-free. Assuming all processors 30 are fault-free (i.e., the best case), then the time taken by the protocol is directly proportional to the number of processors 30. This is because each processor 30 must broadcast its result and then compare its vote to the votes of the other processors 30. If all the votes agree (as they would if all the processors 30 were fault-free), then each processor 30 need make only N comparisons, where N is the total number of processors 30. On the other hand, if all processors 30 are faulty (i.e., the worst case), then the time is proportional to the square of the number of processors 30. This worst-case result arises because, when the processors 30 compare the votes, none of the votes agree with each other, so all must be compared to every other vote.

Figure 4:
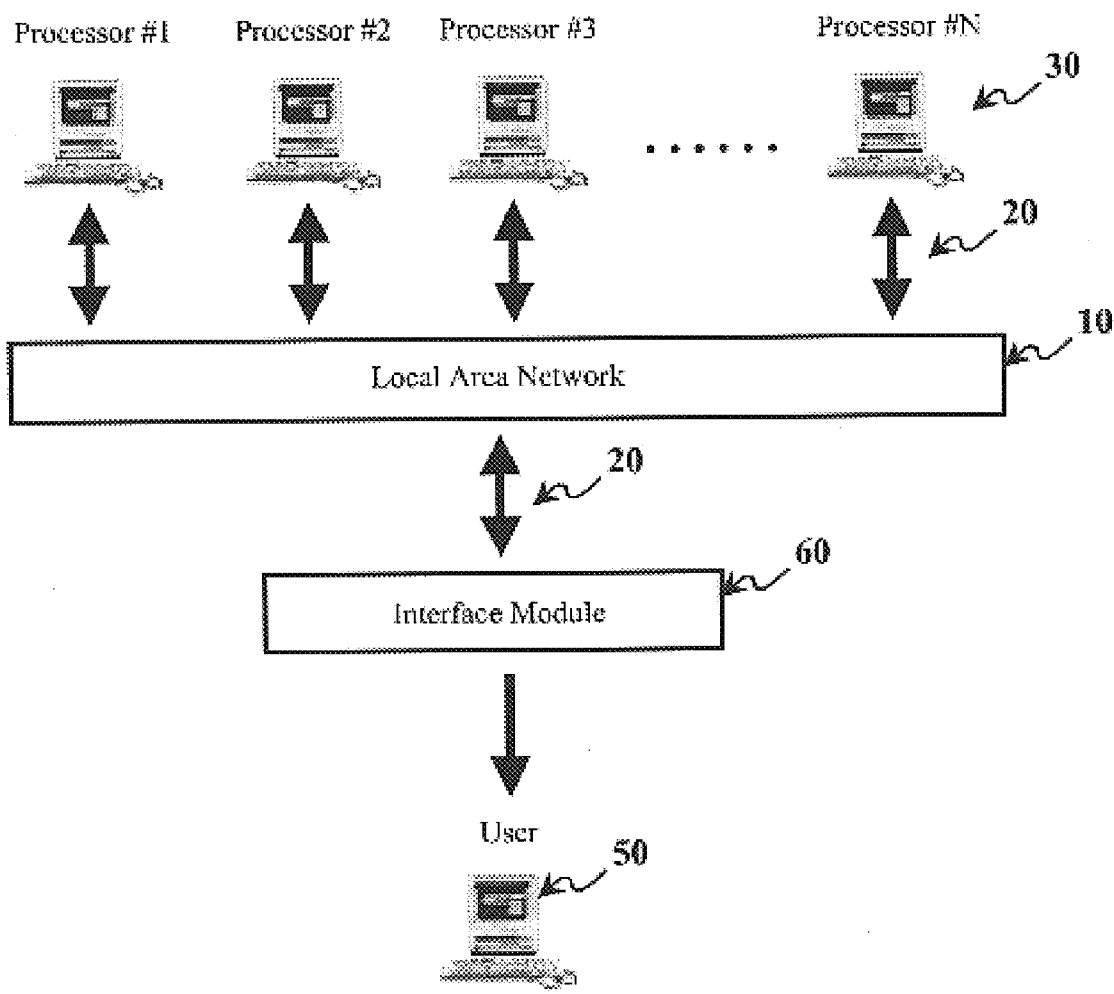
FIG. 4 is a block diagram of the network architecture of the present invention.

Having given an overview of the prior art and reference to FIGS. 1, 2, and 3 thereof, reference is now made to FIG. 4 where the environment of the present invention is similarly a distributed environment of a local-area network 10 with a bus 20 architecture. The present invention has two sets of participants. One is a set of voting processors 30 on local area network 10, which set can be arbitrarily large but must have at least three members. These voting processors 30 are completely independent; the only information they exchange is each voting processor's 30 individual result. The other set of participants contains user 50 and interface module 60. Similar to the prior art, interface module 60 buffers user 50 from the voting processors 30. But interface module 60 is not limited to its singular prior art corollary function. Instead, interface module 60 comprises a memory buffer 230 (see FIG. 6) plus a timer 240 (see FIG. 6). A task is sent from user 50, through interface module 60, to the voting processors 30. When the algorithm terminates, interface module 60 passes the final result back to user 50.

The environment for the present invention is a network capable of an atomic broadcast and a bounded message delay (e.g., local area network 10). A fair-use policy is enforced so no host can indefinitely appropriate the broadcast medium (see Tanenbaum, *Computer Networks*). No voting processor 30 commits an answer until all voting processors 30 are ready. This requirement is easily enforced by setting an application-dependent threshold beyond which all functional voting processors 30 should have their results ready. A commit attempted before this threshold is reached is automatically invalid. Each voter can commit only once; interface module 60 ignores a commit from a voting processor 30 that has previously committed. The most important assumption is that a majority of participating voting processors 30 are fault-free and follow the protocol faithfully (they are called "trustworthy voters"). No assumptions are made about the remaining voting processors 30 (the "untrustworthy voters"). They can refuse to participate, send arbitrary messages, commit incorrect results, etc. but they are not bound in any way.

Figure 5A:
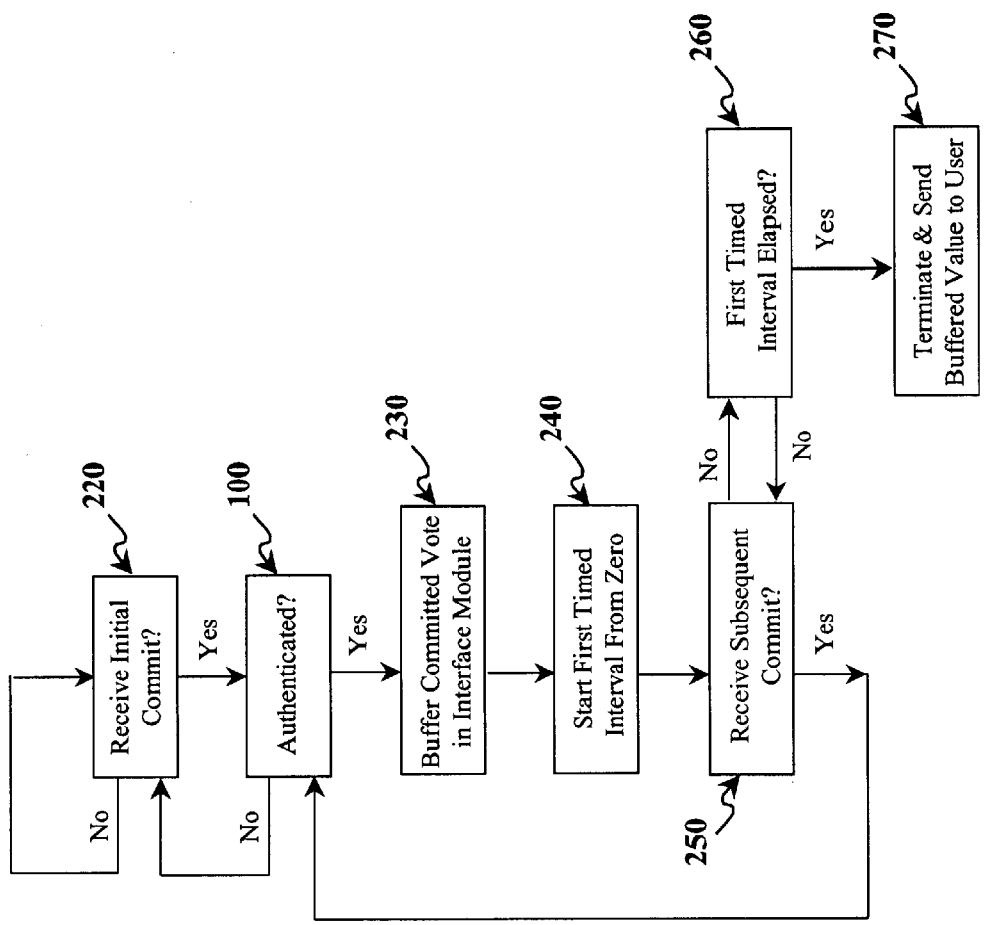
FIG. 5a is a flowchart of the process performed by the interface module of the present invention.
Figure 5B:
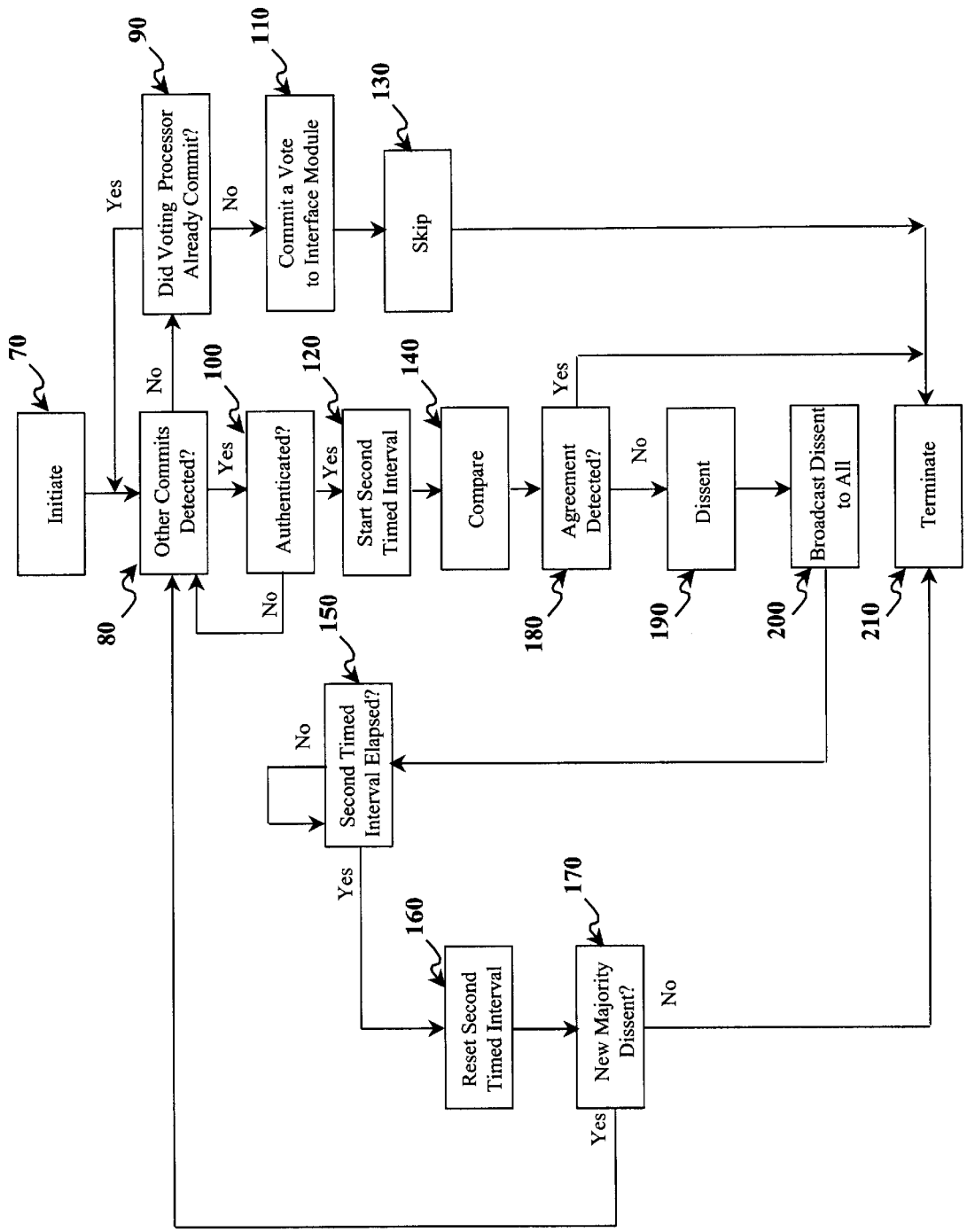
FIG. 5b is a flowchart of the process performed by the majority voting algorithm of the present invention.

Referring now to FIG. 5a and FIG. 5b concurrently as they represent simultaneous processes in the present invention, interface module 60 (see FIG. 6) follows the steps of storing a committed vote in memory buffer 230 (also see FIG. 6) and a first timed interval 240 (see FIG. 6) is started. This first timed interval 240 is set to allow time for each voting processor 30 to check the result of committing 110, dissent 190 if necessary and commit 110 again, if necessary. If the result of an initial commit 110 is received 220 before the first timed interval 240 elapses 260, the new result is written over the old result in the memory buffer 230, and the first timed interval 240 is restarted from zero. If no commit 110 occurs before the first timed interval 240 elapses 260, then interface module 60 sends the result in memory buffer 230 to user 50, and the process is terminated 270.

Each voting processor 30 (see FIG. 4) initiates 70 the voting process in the present invention. If no commits are detected 80 as a result of any other voting processor 30 having committed 110 a vote to interface module 60 (see FIG. 4), voting processor 30 does so with its own vote; it then skips 130 the steps of detecting a dissent 190 and comparing 140. If another voting processor 30 has committed a vote 110, the voting processor 30 compares 140 the committed value from the other voting processor 30 with its own vote.

If agreement is detected 180 among votes upon comparison 140, the voting processor 30 does nothing further but proceed to termination 210. If a dissent 190 is detected, the voting processor broadcasts 200 its dissenting vote to all the other voting processors 30 and a second timed interval is started 120 which determines the interval in which all voting processors 30 are to compare 140 their votes with the committed value. Once this second timed interval elapses 150, it is reset 160, and voting processor 30 determines if a new majority dissent exists 170 among the dissenting votes. If the existence of a new majority dissent is not detected 170, voting processor 30 does nothing other than proceed to termination 210. If a new majority dissent is detected 170, then the voting processor returns to begin the process again.

For the correct execution of the present invention, the result of each commit 110 sent to interface module 60 from the various voting processors 30 must be authenticated 100, as must the messages between the voters themselves. Any known sophisticated authentication technique can enforce secure communication, but such enforcement should not increase the complexity of interface module 60. For authentication between voting processors 30, there is no limit to the computational power available, so the particular method chosen is not important. Interface module 60, however, should be kept as simple as possible.

Interface module 60 buffers 230 a committed vote 110 from a voting processor 30, resets the first timed interval 240, waits while checking 260 for the interval to end, and delivers the result to user 50 (see FIG. 4). It is possible that the first timed interval 240 may be reset several times before it sends the final result to user 50. In addition, interface module 60 should be able to authenticate 100 a voting processor 30, so that it can track the voting processors 30 to ensure that each commits a vote 110 no more than once 90 in a given voting cycle. In order to reduce the likelihood of attacks on interface module 60, it should be isolated from the rest of the voting processor 30 complex and have minimal interaction with the outside world.

The design of interface module 60 may vary depending upon the level of voting. Voting may proceed in either hardware or software. Voting depends on the volume of data, the complexity of computation, and the approximation and context dependency of the voting algorithms. Interface module 60 may best be implemented in hardware for low-level, high-frequency voting, in software for high-level, low-frequency voting. These choices follow because voting is generally more complex at higher levels of abstraction. A software implementation is simpler. As the first timed interval 240 operates in real time, a real-time operating system provides better performance than a nonreal-time operating system. The latter requires multiple context switches to process each event, thereby offering coarser time granularity than a real-time operating system. A real-time operating system can be optimized to require fewer time-consuming operations.

For the present invention to be correct, it must meet two criteria: Firstly, it must always terminate 210. Secondly, when it terminates, it must have the correct result. The correctness of the results of the present invention has been proven using the formal methods of Lamport's Temporal Logic of Actions (see L. Lamport, *The Temporal Logic of Actions,* 16 ACM Transactions on Programming Languages and Systems (No. 3, May 1994), 872–923.)

The number of times that the protocol repeats to correct an incorrect commit 110 can be set by user 50. The upper and lower bounds for the number of repeats are one (meaning that the processors get only a single chance among them to correct a faulty committal), and one less than the number of processors (meaning that each processor gets to correct a faulty committal), respectively.

There is a benefit in security from increasing the number of retries. Even if an attacker compromises that processor 30 which acts as coordinator, an incorrect result cannot be committed without those processors 30 which are non-compromised, correcting it. With the number of retries set to one less than the number of processors 30, an attacker has to compromise a majority of the processors 30 before being able to commit 110 an incorrect result. If the objective is better performance rather than stronger security, the number of retries should be set to one. One must note, however, that setting the number of retries to zero gives optimal performance but no fault-tolerance. Even with only one retry, the protocol still provides comparable fault tolerance and better security than the prior art.

Figure 6:
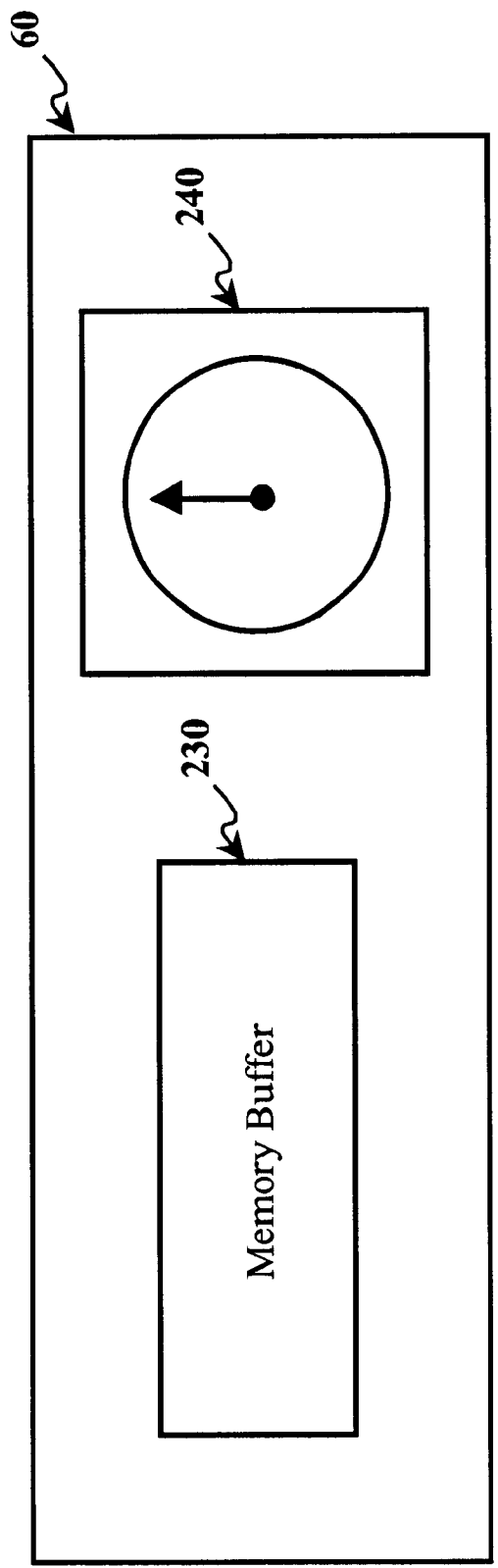
FIG. 6 is a block diagram of the interface module of the present invention.

FIG. 6 has been referred to indirectly in the description of FIG. 5a and FIG. 5b above.

Figure 7:
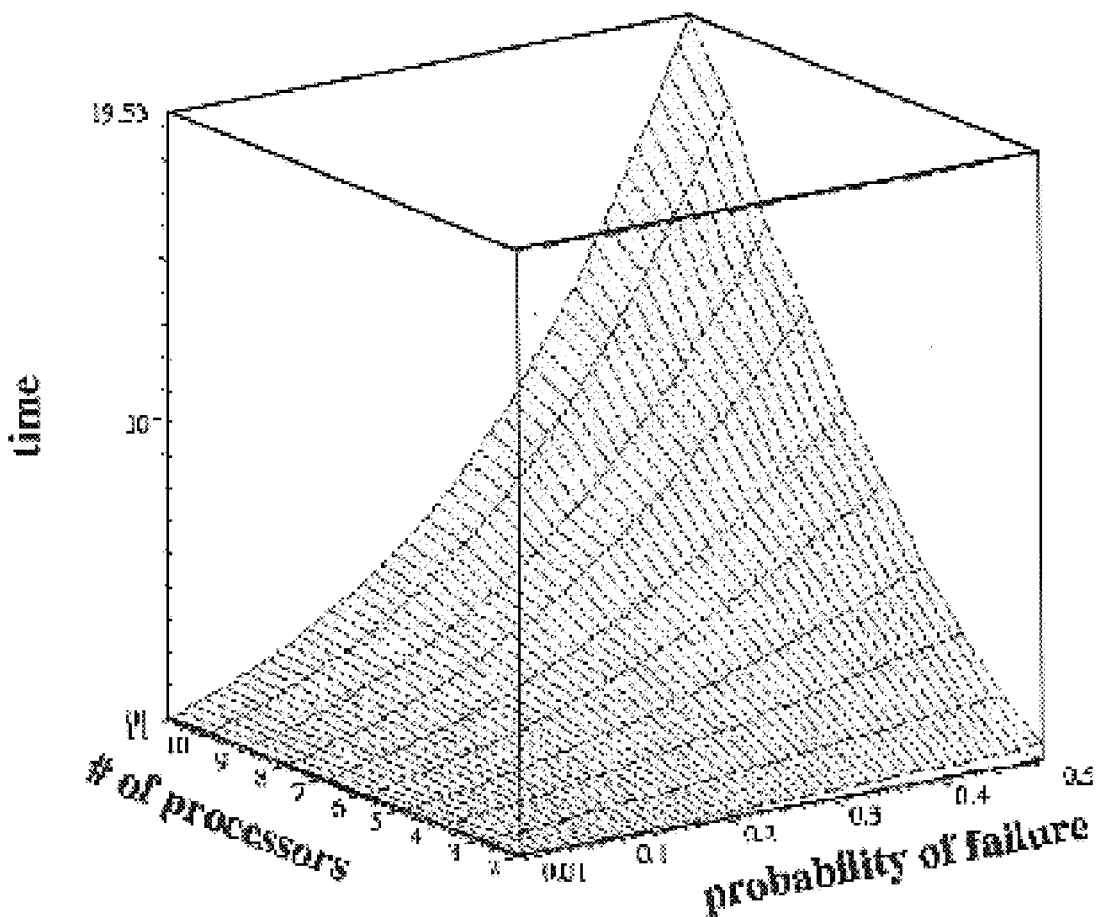
FIG. 7 is a graph of the performance of the present invention.

Referring now to FIG. 7, the time for the present invention to determine a final answer depends both on the number of processors 30 (see FIG. 4) and on their status as either faulty or fault-free. However, if all processors 30 are fault-free (i.e., the best case), then the time to determine a final answer is independent of the number of processors 30. In other words, no matter how many processors 30 are voting (and the more there are, the better both the fault-tolerance and the security), it takes the same amount of time to arrive at an answer. Only that processor 30 performing coordination must broadcast 130 (see FIG. 5) its result. Then each processor 30 compares 100 (see FIG. 5) its vote to the vote of that processor 30 performing coordination. If all votes agree (as they would if all the processors were fault-free) then nothing more needs to be done. On the other hand, if all the processors are faulty (the worst case), then the time to determine a final answer increases with the square of the number of processors 30, just as in the prior art.

This increase results because, when the processors 30 compare 140 the votes, none of the votes agree with each other. All the processors 30 broadcast 200 dissenting votes, which must then be compared 140. The time taken is graphed in FIG. 7. On the average, the present invention offers substantially better performance than the prior art.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for improving the security in distributed environment voting, comprising the steps of:

initiating a majority voting algorithm within each of at least three voting processors;

distributing a committed vote from one of said at least three voting processors, which has not previously committed a vote, to a local area network;

passing said committed vote from said local area network to an interface module;

buffering, within said interface module, said committed vote from a user;

triggering the start of a first timed interval during which subsequent committed votes are received and authenticated;

terminating said majority voting algorithm and passing a final result to said user upon lapse of said first timed interval;

triggering the start of a second timed interval, upon receipt of said committed vote, within each of said at least three voting processors during which each of said at least three voting processors is permitted to compare said committed vote with its own vote;

detecting, within each of said at least three voting processors, an agreement or a dissent with said committed vote;

pausing only those of said at least three voting processors which agree with said committed vote; and

EITHER reinitiating said majority voting algorithm upon detection of a new majority dissent with said committed vote;

OR allowing said first timed interval to lapse if no new majority dissent is detected, thereby terminating aid majority voting algorithm.

2. The method of claim 1, wherein said step of initiating further comprises the steps of:

detecting the presence of a committed vote and EITHER
 a. if no committed vote is detected, then
  checking whether a voting processor has not already committed a vote;
  committing a vote from said voting processor; and
  skipping the steps of detecting a dissent and comparing said committed vote
OR
 b. if a committed vote is detected, then
  authenticating said committed vote;
  triggering the start of said second timed interval; and
  comparing said committed vote to said vote of said voting processor.

3. The method of claim 2, wherein said step of detecting an agreement or a dissent in said majority vote further comprises the step of EITHER:
 a. skipping the remaining steps of said majority voting algorithm and proceeding to a termination of said majority voting algorithm if agreement with said committed vote is detected
OR
 b. resolving said dissent with said committed vote.

4. The method of claim 3, wherein said step of resolving said dissent with said committed vote further comprises the steps of:
 broadcasting a dissenting vote of a corresponding voting processor to all other said voting processors;
 waiting for said first timed interval to elapse; and
 resetting said first timed interval; and
 determining if a new majority dissent exists.

5. The method of claim 4, wherein said step of determining if a new majority dissent exists further comprises the step of EITHER:

a. proceeding to a termination of said majority voting algorithm if a new majority dissent does NOT exist
OR
 b. re-initiating said step of detecting the presence of committed vote if a new majority dissent DOES exist.

6. The method of claim 1, wherein said step of passing said committed vote from said local area network to an interface module further comprises the steps of:

waiting for an initial committed vote;

storing only those authenticated committed votes in a memory buffer;

restarting said first timed interval from zero during which said voting processor performs the steps of:
 checking the result of committing;
 dissenting if necessary;
 committing again, if necessary; and EITHER
  a. overwriting an old commit in said memory buffer with a new commit;
  resetting said second timed interval; and
  repeating said step of checking the result of committing IF said interval has NOT elapsed
 OR
  b. sending a committed result in said memory buffer to said user IF said second timed interval ELAPSES before a new commit occurs.

7. The method of claim 6, wherein said step of storing only those authenticated committed votes in a memory buffer further comprises the steps of:

authenticating each committed vote prior to said step of storing; and tracking each said voting processor to insure that each commits no more than once.

8. Apparatus for improving the security in distributed environment voting, comprising:

means for initiating a majority voting algorithm within each of at least three voting processors;

means for distributing a committed vote from one of said at least three voting processors, which has not previously committed a vote, to a local area network;

means for passing said committed vote from said local area network to an interface module;

means for buffering, within said interface module, said committed vote from a user;

means for triggering the start of a first timed interval during which subsequent committed votes are received and authenticated;

means for terminating said majority voting algorithm and passing a final result to said user upon lapse of said first timed interval;

means for triggering the start of a second timed interval within each of said at least three voting processors, upon receipt of said committed vote;

said means for triggering further comprising:
 means for comparing by each of said at least three voting processors of said committed vote to its own vote;

means for detecting, within each of said at least three voting processors, an agreement or a dissent with said committed vote;

means for pausing only those of said at least three voting processors which agree with said committed vote; and

EITHER means for reinitiating said majority voting algorithm upon detection of a new majority dissent with said committed vote;

OR
means for allowing said first timed interval to lapse if no new majority dissent is detected, thereby terminating said majority voting algorithm.

9. Apparatus as in claim 8, wherein said means for initiating further comprises:
means for detecting the presence of a committed vote, the possible result being EITHER
a. no committed vote is detected, wherein said means for detecting the presence of a committed vote further comprises:
means for checking whether a voting processor has not already committed a vote;
means for committing a vote from a voting processor; and
means for bypassing said means for detecting a dissent and said means for comparing said committed vote
OR
b. a committed vote is detected, wherein said means for detecting the presence of a committed vote further comprises:
means for authenticating said committed vote;
means for triggering the start of said second timed interval; and
means for comparing said committed vote to a vote of said voting processor.

10. Apparatus as in claim 9, wherein said means for detecting an agreement or a dissent in said majority vote further comprises EITHER:
a. means for proceeding to a termination of said majority voting algorithm if agreement with said committed vote is detected
OR
b. means for resolving said dissent with said committed vote.

11. Apparatus as in claim 10, wherein said means for resolving said dissent with said committed vote further comprises:
means for broadcasting a dissenting vote of a corresponding voting processor to all other said voting processors;
means for waiting for said second timed interval to lapse;
means for resetting said second timed interval; and
means for determining if a new majority dissent exists.

12. The method of claim 11, wherein said means for determining if a new majority dissent exists further comprises EITHER:
a. means for proceeding to a termination of said majority voting algorithm if a new majority dissent does NOT exist
OR
b. means for re-initiating said means for detecting the presence of a committed vote if a new majority dissent DOES exist.

13. Apparatus as in claim 8, wherein said means for passing said committed vote from said local area network to an interface module further comprises:
means for waiting for an initial committed vote;
means for storing only those authenticated committed votes in a memory buffer;
means for restarting said first timed interval from zero;
means for causing said voting processor to check the result of committing during said interval;
means for causing said voting processor to dissent if necessary, during said interval; and
means for causing said voting processor to commit again, if necessary, during said interval, said means for voting processor to commit again further comprising EITHER
a. means for overwriting an old commit in said memory buffer with a new commit;
means for resetting said first timed interval; and
means for rechecking the result of committing IF said interval has NOT elapsed
OR
b. means for sending a committed result in said memory buffer to said user IF said first timed interval ELAPSES before a new commit occurs.

14. Apparatus as in claim 13, wherein said means for storing only those authenticated committed votes in a memory buffer further comprises:
means for authenticating each committed vote prior to storing in said memory buffer; and
means for tracking each said voting processor to insure that each commits no more than once.

15. Apparatus for improving the security in distributed environment voting, comprising:
a first device that initiates a majority voting algorithm within each of at least three voting processors;
a second device that distributes a committed vote from one of said at least three voting processors, which has not previously committed a vote, to a local area network;
a third device that passes said committed vote from said local area network to an interface module;
a fourth device that buffers, within said interface module, said committed vote from a user;
a fifth device that triggers the start of a first timed interval during which subsequent committed votes are received and authenticated;
a sixth device that terminates said majority voting algorithm and passes a final result to said user upon lapse of said first timed interval;
a seventh device that triggers the start of a second timed interval within each of said at least three voting processors, upon receipt of said committed vote;
said seventh device further comprising:
an eighth device that compares said committed vote to the vote of each of said at least three voting processors;
a ninth device that detects, within each of said at least three voting processors, an agreement or a dissent with said committed vote;
a tenth device that pauses only those of said at least three voting processors which agree with said committed vote; and
EITHER
a. an eleventh device that reinitiates said majority voting algorithm upon detection of a new majority dissent with said committed vote;
OR
b. a twelfth device that allows said first timed interval to lapse if no new majority dissent is detected, thereby terminating said majority voting algorithm.

16. Apparatus as in claim 15, wherein said first device that initiates further comprises:
A thirteenth device that detects the presence of a committed vote, the possible result being EITHER
a. no committed vote is detected, wherein said thirteenth device that detects the presence of a committed vote further comprises:

a fourteenth device that checks whether a voting processor has not already committed a vote;

a fifteenth device that commits a vote from a voting processor; and a sixteenth device that bypasses said ninth device that detects a dissent and said eighth device that compares said committed vote

OR b. a committed vote is detected, wherein said thirteenth device that detects the presence of a committed vote further comprises:

a seventeenth device that authenticates said committed vote;

an eighteenth device that triggers the start of said second timed interval; and an nineteenth device that compares said committed vote to a vote of said voting processor.

17. Apparatus as in claim 16, wherein said ninth device that detects an agreement or a dissent in said majority vote further comprises EITHER:

a. twentieth device that causes of said majority voting algorithm to proceed to a termination if agreement with said committed vote is detected

OR b. a twenty-first device that resolves said dissent with said committed vote.

18. Apparatus as in claim 17, wherein said twenty-first device that resolves said dissent with said committed vote further comprises:

a twenty-second device that broadcasts a dissenting vote of a corresponding voting processor to all other said voting processors;

a twenty-third device that waits for said second timed interval to lapse;

a twenty-fourth device that resets said second timed interval; and a twenty-fifth device that determines if a new majority dissent exists.

19. The method of claim 18, wherein said twenty-fifth device that determines if a new majority dissent exists further comprises EITHER:

a. a twenty-sixth device that causes said majority voting algorithm proceeding to a termination if a new majority dissent does NOT exist

OR b. a twenty-seventh device that re-initiates said thirteenth device that detects the presence of a committed vote, if a new majority dissent DOES exist.

20. Apparatus as in claim 15 wherein said third device that passes said committed vote from said local area network to an interface module further comprises:

a twenty-eighth device that waits for an initial committed vote;

a twenty-ninth device that stores only those authenticated committed votes in a memory buffer;

a thirtieth device that restarts said first timed interval from zero;

a thirtieth-first device that causes said voting processor to check the result of committing during said interval;

a thirty-second device that causes said voting processor to dissent if necessary, during said interval; and a thirty-third device that causes said voting processor to commit again, if necessary, during said interval, said thirty-third device that causes said voting processor to commit again, further comprising EITHER a. a thirty-fourth device that overwrites an old commit in said memory buffer with a new commit;

a thirty-fifth device that resets said second timed interval; and a thirty-sixth device that rechecks the result of committing IF said interval has NOT elapsed

OR b. a thirty-seventh device that sends a committed result in said memory buffer to said user IF said first timed interval ELAPSES before a new commit occurs.

21. Apparatus as in claim 20, wherein said twenty-ninth that stores only those authenticated committed votes in a memory buffer further comprises:

a thirty-eighth device that authenticates each committed vote prior to storing in said memory buffer; and a fortieth device that tracks each said voting processor to insure that each commits no more than once.

* * * * *